May 28, 1963 W. B. CLARK ETAL 3,091,685
WELDING APPARATUS
Filed July 31, 1959 4 Sheets-Sheet 1
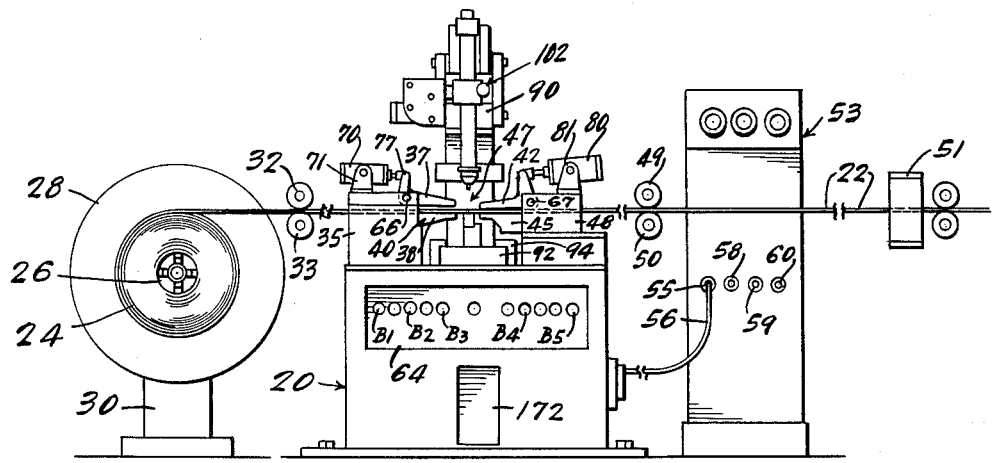
FIG-1-
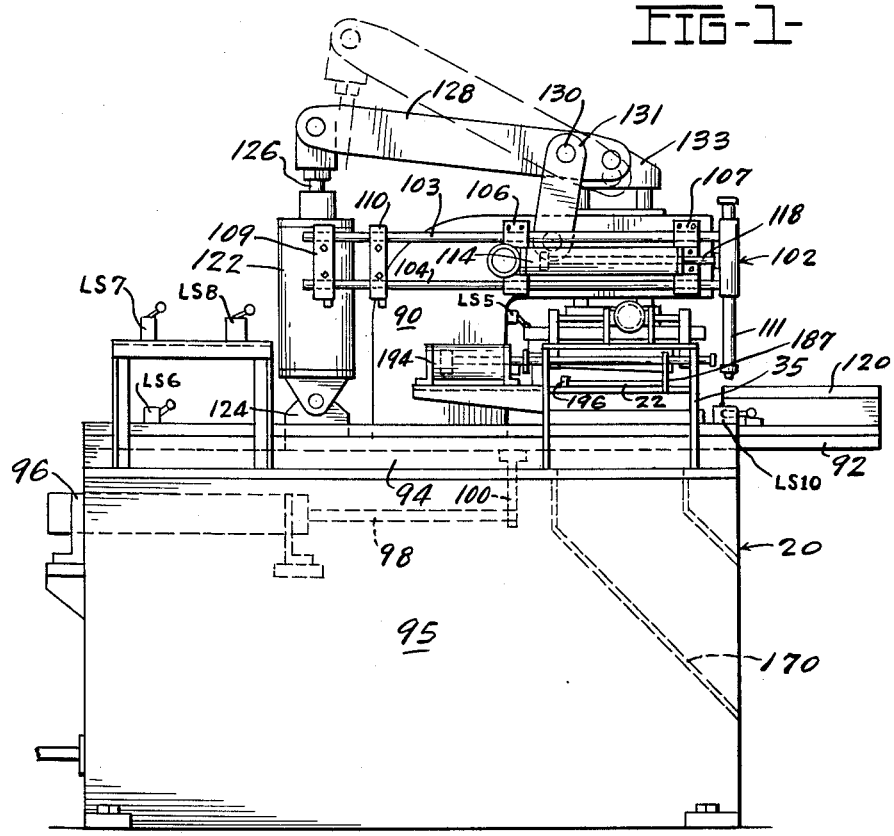
FIG-2-
INVENTORS:
WILLIAM B. CLARK,
BY ALBERT R. CLARK.
W. P. Carr
ATTORNEY.

May 28, 1963
W. B. CLARK ETAL
3,091,685
WELDING APPARATUS
Filed July 31, 1959
4 Sheets-Sheet 2
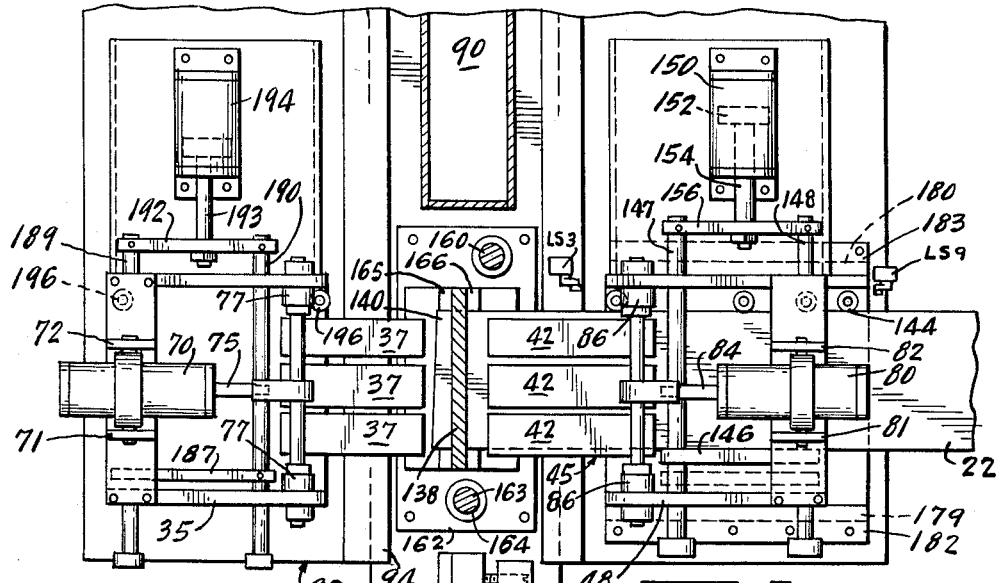
FIG-3-
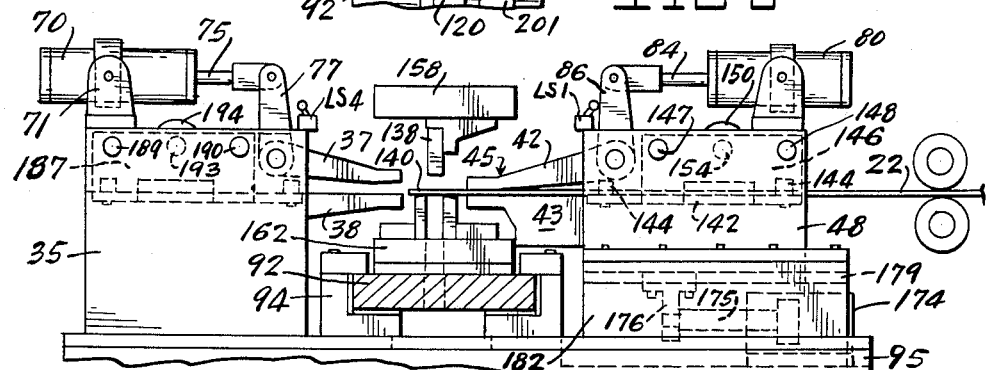
FIG-4-
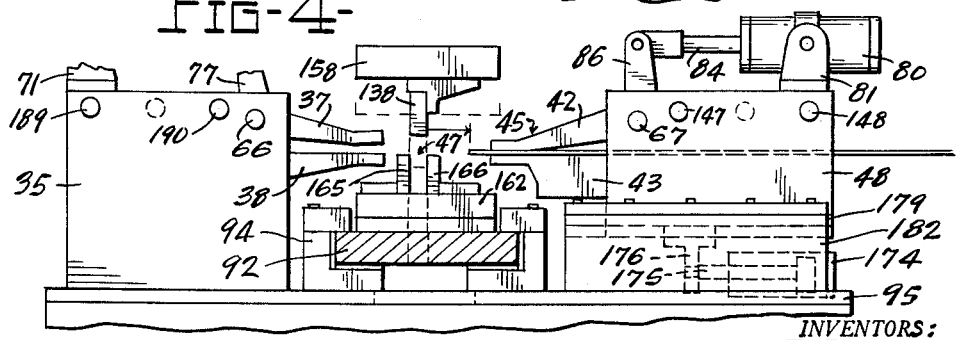
FIG-5-
INVENTORS:
WILLIAM B. CLARK,
BY ALBERT R. CLARK
W. P. Carr
ATTORNEY.

May 28, 1963 W. B. CLARK ETAL 3,091,685
WELDING APPARATUS
Filed July 31, 1959 4 Sheets-Sheet 3
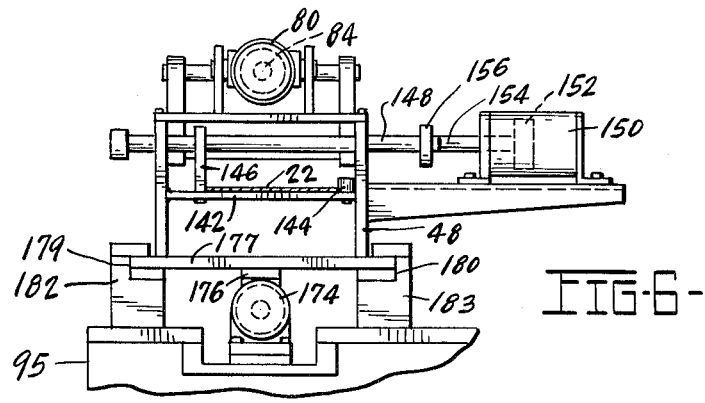
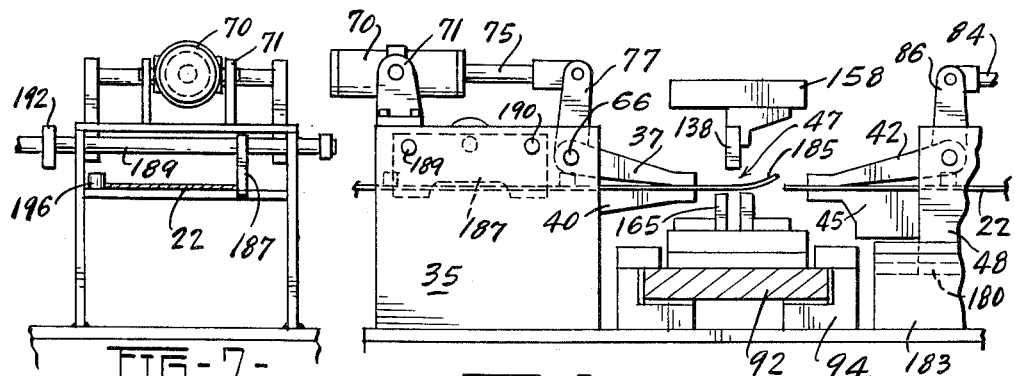
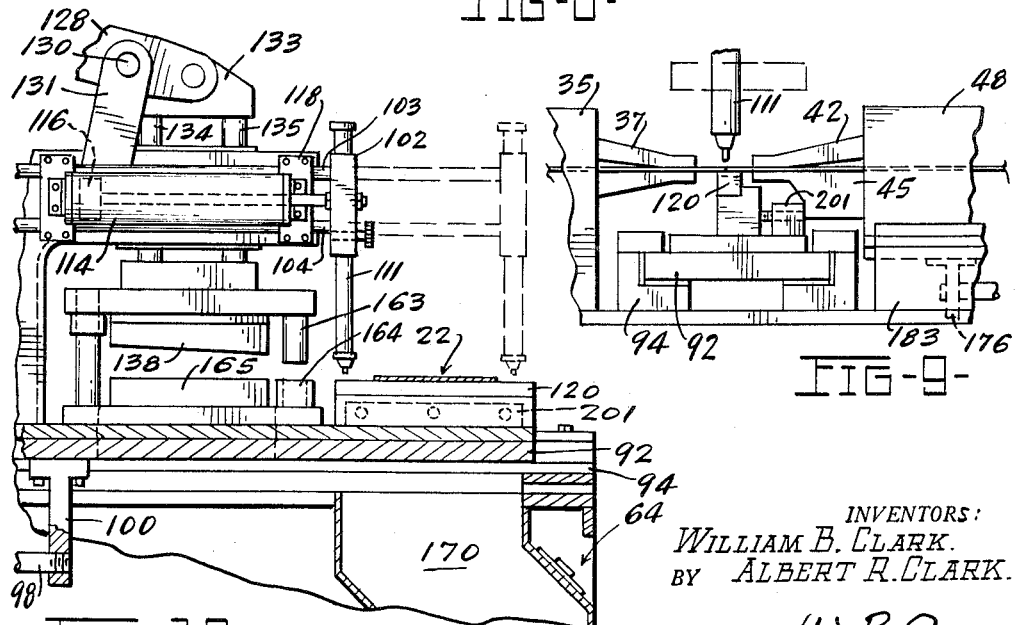
INVENTORS:
WILLIAM B. CLARK.
BY ALBERT R. CLARK.
W. P. Carr
ATTORNEY.

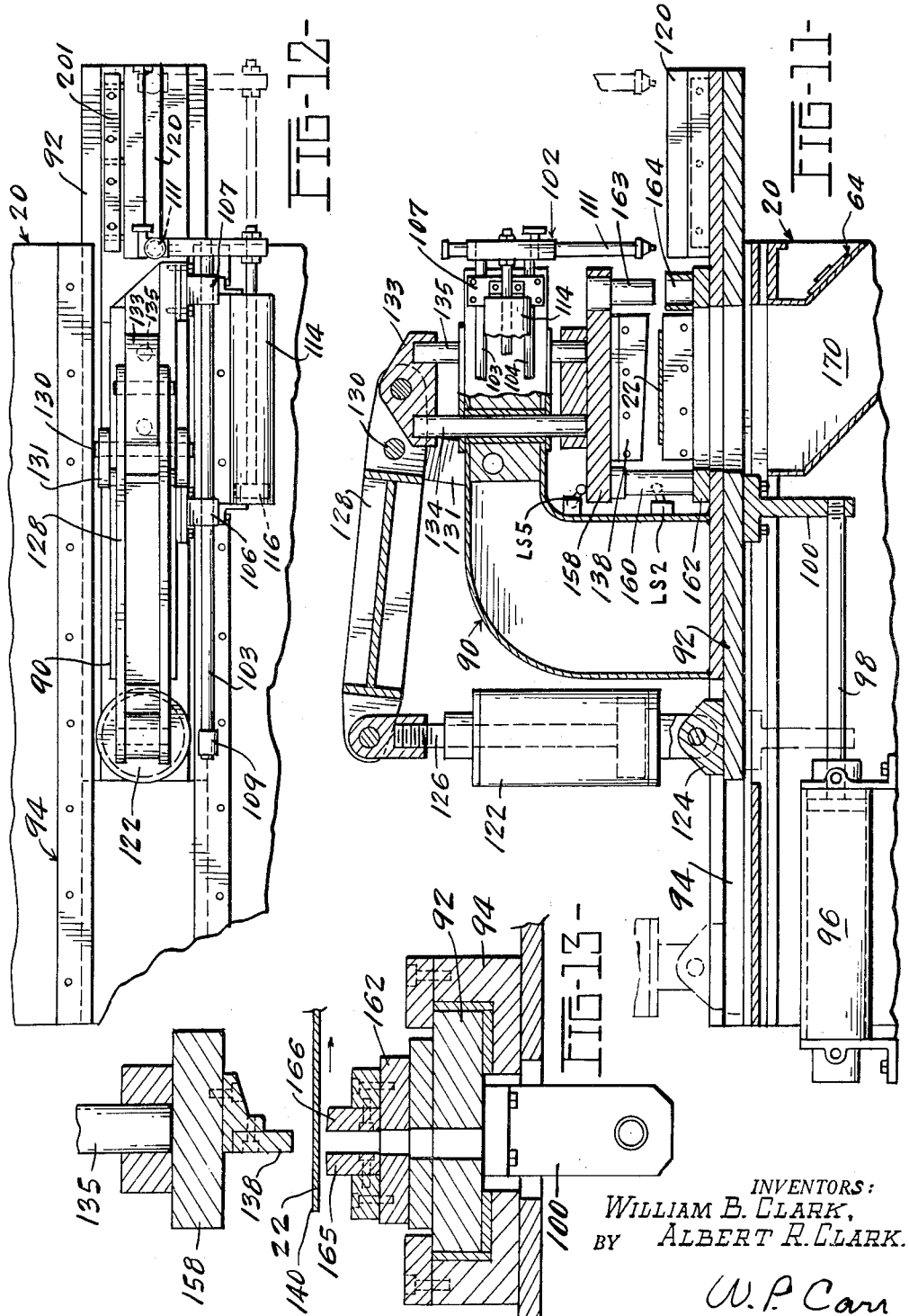

United States Patent Office 3,091,685
Patented May 28, 1963

3,091,685
WELDING APPARATUS
William B. Clark, Maumee, Ohio (Walbridge Road, Walbridge, Ohio), and Albert R. Clark, 346 W. 5th, Perrysburg, Ohio
Filed July 31, 1959, Ser. No. 830,817
9 Claims. (Cl. 219—125)

This invention relates to apparatus for aligning and welding adjoining ends of metal stock in strip, sheet, plate, tube, bar, or other form. More particularly, this invention relates to a welding machine which includes cut-off means for trimming ends of the pieces to be joined before they are abutted for welding. The apparatus of this invention preferably includes a shearing device for such trimming action, but may instead utilize a saw, abrasive wheel or a lathe type cutter.

The apparatus is especially adapted for use in connection with a tube forming mill, but also has considerable value in association with high production stamping machines and other metal working processes in which strips or other forms of elongated stock is constantly fed to a processing machine, and in which continuity of operation is highly desirable.

Because of the high investment presently made in most production equipment, it is economically important that the operation of the equipment be interrupted as little as possible. Where the metal material being supplied to a machine is in a series of pieces or when delivered from long coils or rolls, there is usually an interval after each piece or strip is consumed to allow time for bringing up and starting the feed of the subsequent piece. The time and labor involved in these periodic interruptions may be very costly, not only through the direct expense involved, but through the loss of production.

It is, accordingly, a principal object of this invention to provide apparatus which accurately and expeditiously permanently attaches through welding the forward end of the next piece with the terminating end of the piece being worked through the production equipment.

A further object of the invention is the provision of a machine which aligns the adjoining ends of pieces of the material being fed to the associated production equipment, firmly seizes the ends, trims the ends to conforming contours, brings the ends together, and joins them together by welding.

An additional important object is the provision of means in such a machine for moving the trimmed end of the first piece of material temporarily away from the shearing station while the forward end of the next piece is being trimmed, and means for bringing the two trimmed ends accurately together in abutting or slightly spaced relation as desired for welding purposes.

Another object is to provide a machine in which both the shearing device and the welding torch are mounted on the same reciprocable carriage and the welding torch is additionally mounted on a supplemental carriage movable upon the first carriage.

A still further object is to provide a machine which is automatic in operation, but still which may be placed under manual control when desired.

Yet another object of the invention is the provision of a machine which is not limited in the amount of stock which is cut off from the ends to be attached.

A further object is to provide a machine of the type described which performs both the shearing and welding operations with mechanism above the material.

An additional object is a machine which is open in structure permitting observation of the working elements and easy inspection of the welded joint.

As indicated the machine through which these various objects and advantages are attained includes stock aligning and seizing elements, a traveling cutting device, a movable torch, a source of welding power, and synchronized control elements.

While various gas, arc and resistance welding methods are adaptable to this invention, a preferred form and one that has proved very successful for strip or sheet welding is gas-shielded tungsten arc welding.

This involves an arc between a single tungsten electrode and the work to be welded. As little metal is lost from a tungsten electrode, adjustment of the rod is seldom required. A shield of monatomic inert gas, such as argon, helium, or mixtures of these gases is projected around the electrode. Welding may be performed with or without filler metal. The inert gas envelope permits welding such metals as aluminum, magnesium, nickel alloys, and stainless steel without flux. Welding power sources may be either alternating or direct current, with either polarity. With A.-C. power sources, it is usually necessary to stabilize the arc by using a high-frequency, high voltage pilot circuit superimposed on the welding circuit, or a high open-circuit voltage.

Tube manufacturing is a field in which this machine is currently being advantageously employed. The strip stock material to be formed into the tubing is generally received in coils from the steel mill where it is trimmed accurately to the width necessary for shaping to the required diameter. The process of rolling steel into coiled flat-rolled stock assures a basic high quality material of maximum strength, accurate gauge and excellent surface.

In a tube mill the strip stock first passes through a pair of driving rolls and then through a series of forming rolls that produce the circular cross-section. At the beginning of the operation, the top and bottom forming rolls are opposite in contour, but the final forming rolls are of the same contour, top and bottom. In passing through this series of rolls, the stock is curved gradually until a circular tubular shape is obtained.

From the forming rolls the butted tube is passed through the welding section of the machine. There are several different welding processes employed to close the seam as the edges of the strip come together.

Tube mill equipment has been constantly improved and now may be operated at speeds which consume as much as four hundred feet of steel strip per minute. No doubt higher speeds will be attained with further improved equipment. In past practice, it has been necessary to shut down the tube mill while the end of the strip, which is almost used up, is fastened by hand welding to the next strip. This shut down interval is usually prolonged more than is necessary by operators leaving their stations and by the lack of any feeling of urgency in regard to the welding operation.

Even with prompt action, at least several minutes are involved and manual welding difficulties may multiply the length of the period many times. It is obvious that a considerable production of tubing is lost and very expensive equipment is idled. With the subject welding machine and a looper for permitting the end of the strip being formed to be held while the balance of the strip is drawn from the loop as it moves into the tube mill, the attachment of the strip with the next strip may be made accurately and most rapidly.

The embodiment of the invention selected for disclosure herein is particularly adapted for association with a tube mill, as such use is a prime example of the benefits attained through the employment of the invention.

In FIGURE 1 is shown in front elevation a welding machine embodying my invention in association with a holder for feeding strip steel to and through the machine from a coil, and also a guide and aligning device for receiving the strip from the machine and delivering it to subsequent production equipment such as a tube mill or high speed stamping presses. Behind and to the side of the machine is shown a welding power unit which controls the delivery to the machine of proper electrical torch current, cooling water and inert gas;

FIGURE 2 is a side elevation on an enlarged scale of the machine of FIGURE 1 with parts removed;

FIGURE 3 is a horizontal section of the forward end of machine of the previous figures with the end of the exiting strip ready to be sheared;

FIGURE 4 is a front elevation with parts in vertical section of the portion of the machine illustrated in FIGURE 3;

FIGURE 5 is a view similar to that of FIGURE 4 after the strip has been trimmed by shearing and withdrawn by the clamp assembly from the center of the machine;

FIGURE 6 is a vertical section longitudinally of the machine through the exiting strip aligning and clamping mechanism;

FIGURE 7 is a like showing of the mechanism on the other side of the machine for clamping and aligning the new entering strip;

FIGURE 8 is a partial front elevation of the center and left side of the machine with the entering strip aligned and clamped, ready to be sheared;

FIGURE 9 is a front view of the sheared ends of the exiting and entering strips brought together for the welding operation;

FIGURE 10 is a side elevation indicating the path of the welding torch across the abutting ends of the strip;

FIGURE 11 is an elevational view on an enlarged scale of the shearing operation pictured in FIGURE 4;

FIGURE 12 is a plan view of the torch carriage and reciprocating mechanism; and

FIGURE 13 is an enlarged vertical section of the shearing mechanism as seen in FIGURE 4.

In the somewhat schematic view of equipment shown in FIGURE 1, machine 20 embodies one form of the invention. This embodiment is particularly adapted to weld together the terminating end of one strip of steel with the beginning end of a following strip. A continuous strip 22 is shown moving through the machine from a supply coil 24 mounted on a rotating mandrel 26 projecting from a mounting 28 which is supported upon a pedestal 30. The steel strip 22 first travels from the coil through a pair of guide rollers 32 and 33.

In traversing through the machine 20, the strip first passes through an aligning chamber 35 on the entering side of the machine and between the open jaws 37 and 38 of the entering clamp 40. The strip continues past the shearing and welding station 47 at the center of the machine, through the open jaws 42 and 43 of the exiting clamp 45 and out a discharge and aligning chamber 48 following the clamp.

In moving from the machine, the strip passes through guide rollers 49 and 50, and thence through roller assembly 51 by which the strip is directed into the following production equipment. The speed of travel of the strip may be as high as four hundred feet per minute or more to meet the demands of modern production equipment.

Depicted schematically in FIGURE 1 is a welding power supply unit 53. This has an outlet 55 with a lead wire 56 for furnishing proper electrical current to the welding torch of the machine. Other outlets such as 58, 59 and 60 are for the controlled delivery to the machine of cooling water and inert gas as required in the welding operation. While the proper current is established by the welding power unit 53, the flow of welding current as well as that of the cooling water and inert gas from the unit is preferably under the control of automatic equipment forming a part of the machine 20 and which is variously actuated.

Control knobs or buttons for automatic or alternate manual operation are indicated in part as B1, B2, B3, B4 and B5 on the instrument panel 64 on the front of the machine.

The lower jaws 38 and 43 of the entering and exiting clamps 40 and 45 are in this embodiment set in a stationary position with the upper jaws 37 and 42 pivotally mounted on shafts 66 and 67. The jaw 37 of the entering clamp is closed and opened by the action of the fluid cylinder 70 which is rockably mounted on brackets 71 and 72.

A piston rod 75 from the cylinder 70 is connected to the arm 77 projecting upwardly from the jaw 37. Similarly the movable jaw 42 of the exiting clamp is closed and opened through the action of a fluid cylinder 80 mounted on a pair of brackets 81 and 82. Piston rod 84 from the cylinder 80 is joined to the upright arm 86 of the jaw 42. The upper jaws 37 and 42 are preferably segmented to better seize stock of slightly irregular thickness.

A main carriage 90 on which the shearing and welding mechanisms are mounted has a lower slide member 92 reciprocable in a guideway 94. The guideway is supported upon a frame of substantial construction in the base 95 of the machine. As indicated in FIGURE 2, the reciprocation of the carriage 90 is accomplished through the operation of a power cylinder positioned below the carriage. The rod 98 from the cylinder is secured to a leg 100 depending from the slide member 92.

The electrode holder or welding torch 102 is carried at the forward end of the carriage 90. The torch is also mounted for horizontal reciprocating movement on the main carriage 90 through its attachment to the rods 103 and 104 which are slidingly fitted in bores in guide members 106 and 107.

The inner ends of rods 103 and 104 are held in spaced relation by cross pieces 109 and 110. The back and forth movement of the arc torch 102 and its associated welding rod 111 is secured through the operation of the fluid cylinder 114, the piston 116 of which is connected to the torch through piston rod 118. Fastened to the forward end of the slide member 92 of the carriage 90 is a copper bar or shoe 120 acting as a backing electrode to assure complete penetration in the welding operation.

The shearing mechanism, more details of which will be described later in connection with other figures of the drawings, includes a shear blade which is driven downwardly by the power cylinder 122 to trim the ends of the steel strips. This cylinder is carried on the main carriage 90 and is fastened thereto through a bracket 124. The piston rod 126 from the cylinder is fastened to one end of rocking arm 128 which is pivoted at 130 to link 131 which is swiveled to the main carriage 90.

The forward end of the rocking arm 128 is joined to a head piece 133 from which rods 134 and 135 extend downwardly and carry at their lower ends the shearing blade or moving die 138.

When the terminating end of one coil of the strip steel 22 leaves the supply mandrel 26 and approaches the center station 47 of the machine 20, the exit clamp 45 and aligning mechanism associated with this clamp is actuated to position and seize the terminating end of the strip. This structure may be seen in FIGURES 3, 4 and 6.

The terminating end of 140 of the strip 22 extends under the shearing blade 138, depicted in section in FIGURE 3, and the strip 22 extends therefrom under the segmented upper jaw 42 of the exiting clamp 45 and continues through the aligning chamber 48 defined in part by the lower plate 142 serving as the bottom of the chamber and by a series of rollers 144 on the inward side of the pathway.

A pusher bar 146 is suspended from rods 147 and 148 on the opposite side of the pathway nearer the front of the machine. Actuated by a knob on the instrument panel, or through some other control, fluid is admitted to the cylinder 150. The fluid acting upon piston 152 therein withdraws the piston rod 154. Fixed to the end of the piston rod is member 156 which is joined to the rods 147 and 148.

This movement brings the pusher bar 146 against the outer edge of the metal strip 22 and moves the strip squarely against the series of rollers 144. Immediately thereafter, fluid is directed to fluid cylinder 80 to cause the segmented upper jaw 42 of the exiting clamp 45 to move downwardly and seize the strip.

The aligning and the clamping actions are almost instantaneous, and therefore the strip can be seized immediately at any desired position. With the strip so positioned and firmly held, the shearing blade 138 is brought down under the drive of the power cylinder 122.

This trimming of the exiting end of the strip, as accomplished by the descent of the shearing blade 138, may be best understood by referring to the disclosures of FIGURES 11, 12, and 13. The blade may, for example, be five-eighth of an inch thick and four and one-half inches long. To reduce the driving force required, the blade has a conventional shear inclination from one end to the other. While here designed to make a straight cut, a curved blade could be used for special purposes.

From the platen 158, from which the blade or die 138 depends, is a rearwardly positioned guide or stress pin 160 in sliding registry with a bore in the lower die holder or platen 162. A forwardly positioned pin 163 starts above its associated bore 164 in the die holder 162 in order to permit movement of the shearing mechanism, with the blade raised, over a strip in position to be trimmed.

In its descent, the blade 138 fits between the two lower die members 165 and 166. By striking a blank, in this case five eighths of an inch across, from the end portion of the strip, bending and distortion of the trimmed end of the strip is minimized. This is in contrast with the deflection of metal likely accompanying the use of a squaring shear blade type of cutter.

The sheared blank or slug drops down opening 168 in the lower die holder 162 and falls down chute 170 into a scrap chamber 172, the latter being indicated in FIGURE 1. The pieces of the strip severed by the trimming operation also drop into the chute 170 past one side of the die holder 162.

With the arrangement disclosed, involving the rocker arm 128 transferring power from the fluid cylinder 122, a pressure, for instance, of six tons may be available. With heavier sheets or plates where greater pressure, such as thirteen to fifteen tons is required, a hydraulic press may be employed with the blade 138 mounted directly on the ram from the hydraulic cylinder.

After the trimming of the end of the exiting strip, the shearing blade is raised and the exiting clamp assembly 45 moves the remaining strip away from the center shearing station 47, a distance on the order of two and one-half to three inches to temporarily clear the center station 47. In this particular embodiment, the strip has a three-quarter inch section left projecting from the clamp assembly.

The withdrawal of the clamp assembly 45 away from the center is secured through the action of a cylinder 174 which may be seen in FIGURES 5 and 6. The piston rod 175 projecting from the cylinder 174 is joined through flange 176 to a slide member 177 at the base of the clamp assembly. The member 177 slides in a track formed by opposed square cut runways 179 and 180 in the pair of support members 182 and 183. The withdrawn position of clamp assembly 45 is pictured in FIGURE 5.

The next following strip, which is to be welded to the end of the exiting strip 22, is now led into the aligning chamber 35 with which the entering clamp assembly 40 is associated. As the beginning end 185 of the new strip 22 may be bent or otherwise deformed for a certain distance through previous handling, the strip is pushed past the shearing station 47 below the raised blade 158 until any disfigured portion is beyond the blade. Any length may be involved as the strip may be freely pulled over exit clamp 45. With the strip so placed, the aligning mechanism in chamber 35 is actuated and immediately following this side positioning of the strip, the entering clamp 40 is closed through the lowering of jaw 37.

The aligning mechanism on the entering side is shown in FIGURES 3, 7 and 8 and is similar in operation to that associated with the exiting clamp. The mechanism consists of a pusher plate 187 suspended from a pair of rods 189 and 190. As shown in FIGURE 3, these rods are fixed to an end bracket 192 which is connected to the piston rod 193 projecting from cylinder 194.

Under the pressure of the fluid supplied to the cylinder 194, the pusher plate 187 is pulled against the outer side of the entering strip 22 and aligns the strip against the series of rollers 196. Immediately thereafter, through the action of cylinder 70, jaw 37 of the clamp is rocked downwardly to seize the beginning end 185 of the entering strip as shown in FIGURE 8.

Instead of being rocked to closed position jaw 37 and jaw 42 of the exiting clamp 45 may be mounted for straight reciprocating movement on guide rods or slideways.

The shearing blade 138 is again driven down to trim off whatever amount of the new strip is defective and to leave an undistorted end of the new strip for welding to the likewise cleanly trimmed end of the exiting strip. The shear blade is then returned to its upper position and the main carriage 90 is motivated to withdraw the shearing mechanism rearwardly and to bring the welding torch 102 to the position shown in FIGURE 10. The withdrawal movement of the main carriage may, for example, be for a distance of sixteen inches.

The exiting clamp assembly 45 is then actuated by cylinder 174 to return the exiting strip toward the center station 47. A stop 201 fastened to the forward extension of the slide member 92 of the main carriage 90 limits the inward movement of the clamp assembly to bring the ends of the exiting strip and entering strip together as shown in FIGURE 9. The ends may be directly abutted for light gauge material or a slight clearance may be left for metal above fourteen gauge. Any desired clearance or full abutment may be secured through adjustment of the position of the stop member 201.

The return movement of the clamp assembly is equal in extent to distance of its withdrawal of about two and one-half inches plus the width of a five-eighths of an inch of the shearing blade. This amount of movement is, of course, necessary in order to bring the ends of the strips together. The welding torch 102 is now supplied with the required current, cooling water and inert gas and is propelled across the joint between the strip ends. This movement is depicted in FIGURE 10. The mounting of the torch 102 upon rods 103 and 104, with the latter sliding in guide members 106 and 107, is adjustable to assure accurate, level movement of the torch.

High frequency current is desirable at the start of the torch travel to strike the arc. The torch moves at a regular speed and at a fixed distance from the work whereby a smooth uniform weld is achieved. The welding requires only a fraction of a minute, the exact time varying according to the thickness and width of the stock.

After the weld is thus formed, the torch is preferably held in its extended position, which may be eleven inches from its starting position, while the weld is inspected. If it proves satisfactory, the torch is returned back across the joint and the clamps are released to permit progress of the new strip through the exiting clamp assembly and to the production equipment, such as a tube mill, by which the strip stock is being consumed.

The machine is again in the position shown in FIGURE 1 with the continuous strip being fed from a coil 24 mounted on the mandrel 26. The main carriage 90 may at this time be returned to the forward position bringing the shearing mechanism to the center station 47, and with the copper bar 170 constituting the lower electrode or backing member projecting from the machine as seen in FIGURE 2.

The machine is now ready for repeating the described cycle of operation. With the progress of the strip under the observation of the operator, as soon as the terminating end of the new coil approaches the center station, he again activates the exiting aligning and clamping devices and proceeds with the successive steps for attaching the strips.

While each phase of operation of the machine may be placed under the control of an operator, in many situations it is more desirable to have the machine function automatically to a major degree.

This does not apply to the first step as ordinarily it is more feasible to leave to an operator the task of observing the approach of the finishing end of a piece being processed and to initiate the aligning and seizing of the end for attachment to the succeeding piece. However, through the aid of photoelectric cell equipment or other reporting devices, the end of the piece could be detected, and the machine actuated to proceed with the straightening and holding steps.

A semi-automatic arrangement, which has proved very successful, is sketchily depicted in the accompanying drawings. Electrical and compressed air devices thereof are responsive first to the depression of button B1 on the control panel 64 to side position the exiting strip and close clamp 45 thereon. A single valve may be opened to supply fluid pressure to the cylinders operating the aligning mechanism and the clamp with air metered to the clamp cylinder to delay the clamping action until the positioning is completed. The electrical and pneumatic equipment for this first step and for subsequently described actions, including relays, switches, solenoids and valves, are housed within the base 95 with compressed air normally supplied from the plant system. For hydraulic cylinders there would also be required a variable displacement oil pump, associated valves, tubing and other elements.

In the particular setup here involved, a limit switch LS1 illustrated in FIGURE 4 is tripped by the arm 86 projecting up from clamp jaw 42, on closure of the jaw 42. Through this switch operation, air or other fluid is directed to cylinder 122 to drive shearing blade 138 downwardly and thus trim the end of the strip.

Near the bottom of the stroke of the shear a switch LS2 shown in FIGURE 11 is positioned to be tripped by the press platen 158. By the action of this switch, the shear is returned upward and fluid is delivered to cylinder 174 to draw clamp 45 and the secured end of the strip away from the center shearing station 47. In this retracting movement, the clamp 45 closes safety switch LS9 illustrated in FIGURE 3.

With the prescribed arrangement, the machine now comes to a stop to permit the operator to manually introduce a new strip through the entering aligning chamber 35 and through open jaws 37 and 38 of entering clamp 40. The design of the machine allows any amount of the new strip to be drawn past the shearing station 47 and up over the exiting clamp 45 until any damaged first portion of the strip is past the station.

With an undistorted section of the new strip at the shearing station, which will provide a clean attaching end, button B2 of the instrument panel is pressed. This causes the entering strip to be side positioned by the pusher plate 187 and closes clamp 40 upon the entering strip. Limit switch LS4 illustrated in FIGURE 4 is tripped by the closing movement of the clamp jaw 42. Actuated by limited switch LS4—and through safety switch LS9, the closing of which makes certain exit clamp 45 is now away from the shearing station—the shear is driven downward to cut the new strip.

Again the shear is returned upwardly through tripping of limit switch LS2. Limit switch LS5 (FIGURE 11) is closed by the shear in the up position and through a coupling with limit switch LS9 causes shear carriage 90 to be propelled back to its rearward position.

At the finish of its rearward travel, carriage 90 hits limit switch LS6, the location of which is shown in FIGURE 2. This switch actuates the return of the clamp 45 against stop 201 at center station 47 to bring the terminating end of the exiting strip into abutment with the starting end of the new strip. The return of clamp 45 trips limit switch LS3, shown in FIGURE 3. The actuation of switch LS3 after the closing of switch LS6 causes the welding torch to begin its forward movement over the joint between the strip ends.

At the start of the torch carriage movement, limit switch LS7 is closed to actuate the flow of welding current, cooling water and inert gas to the torch electrode. At the end of its forward stroke, the torch carriage trips switch LS8, which shuts off the current and after a delay of a few seconds interrupts the flow of water and gas. These switches LS7 and LS8 may be located as indicated in FIGURE 2.

The machine now comes to a halt to provide an interval for the operator to check the nature of the weld. If it is unsatisfactory, through manual control buttons the weld is sheared out and the ends of the strips brought together for a second welding operation.

With the weld approved, button B3 is pushed and this releases the clamps to permit resumed travel of the joined strips toward the production equipment. Button B3 also brings the shear carriage forward to place the shear in operative position. As the shear arrives at the center station 47, lower die holder 162 trips the limit switch LS10 (FIGURE 2) which acts to return the torch carriage to its retracted position.

As indicated, the electrical controls are arranged to interrupt the automatic sequence of operations and allow manual control of each section of the machine when desired and to permit any operation to be independently repeated.

The machine is able to go through a complete cycle in little more than one minute and is therefore ideally suited for a high production line. With such speed, the production equipment may be maintained in operation by temporary looping of enough of the strip of material going through to last for that short interval.

Where loss of time is not so important or the expense of automatic welding is not warranted, a machine with more hand controls is practical. Even some of the fluid cylinders may be dispensed with and mechanical devices substituted therefor. This would apply to the clamping and aligning devices particularly as, for these, cams or other mechanisms for hand manipulation could be utilized. The shearing operation is preferably left under the motivation of a power cylinder. However, the welding torch may be manually reciprocated and the flow of electrical current and inert gas controlled by manual switches and valves.

It may be concluded from the preceding that applicants have provided a machine that is accurate and fast in operation and which includes effective aligning and clamping mechanism. The design of the machine permits any amount of the strips to be removed before welding the ends and makes it easy for the operator to observe the functioning of the machine and the character of the created weld.

The construction of the shearing device assures clean, undistorted trimmed ends while the temporary withdrawal of the sheared end of the exiting piece facilitates the shearing of the new piece. The arrangement of the shear and torch above the work also contributes to improved results.

While a preferred embodiment is disclosed herein, it should be understood that modifications may be made therein without departing from the spirit and scope of the invention as defined by the following claims.

We claim:

1. Apparatus for welding together the ends of two pieces of metal stock comprising means for seizing a first piece of metal stock, means for positioning a second piece of metal stock in line with the first piece and holding said second piece so positioned, a trimming device having an operative position for cutting off in matching contour the adjacent ends of the first and second pieces, means for bringing and holding the adjacent cut ends of the two pieces together, welding means having an operative position for applying a joining weld between the adjacent cut ends, a horizontally reciprocable main carriage movable in a transverse path generally parallel to the trimmed ends of the pieces of metal stock on which both the trimming device and welding means are mounted, means for moving the main carriage to successively bring the trimming device and welding means to their operative positions, and a supplemental carriage on the main carriage on which the welding means is carried and which is reciprocable independently of the main carriage, the reciprocable path of the supplemental carriage being substantially in line with the path in which the main carriage is moved.

2. Apparatus for attaching together the adjacent ends of two successive pieces of metal stock comprising structure defining a trimming and welding station, clamps for seizing two successive pieces of stock adjacent to and on opposite sides of the station, aligning mechanism integrated with each clamp, a vertically reciprocable shearing means of appreciable thickness, a horizontally movable carriage on which the shearing means is mounted and for bringing the shearing means from a location laterally disposed from the station into operative position above the station, means for driving the shearing means downwardly from its operative position to successively trim the adjacent ends of pieces held by the clamps, means for bringing the trimmed ends together, a welding device mounted on the carriage in horizontally spaced relation from the shearing means, and means moving the carriage to bring the shearing means and the welding device successively to the trimming and welding station.

3. Apparatus according to claim 2 in which there are means moving said clamps horizontally and aligning mechanisms apart after one piece has been clamped and trimmed and before the other piece is clamped and trimmed and moving them back together thereafter.

4. Apparatus according to claim 3 in which the means moving said clamps and aligning mechanisms apart includes a horizontal track for one of said clamps and means for driving said clamp upon said track in a direction away from the other clamp, and in which there is an adjustable stop setting the limit of return of the clamp and increasing the distance of the return of the clamp over that it is first driven away by an amount approximately equal to the thickness of the shearing element.

5. Apparatus for attaching together the ends of two successive pieces of metal stock comprising structure defining a trimming and welding station, clamps for seizing two successive pieces of stock adjacent to and on opposite sides of the station, aligning mechanism associated with each clamp, a vertically reciprocable shearing element, a horizontally movable carriage for the shearing element adapted to bring the element from a non-operative location laterally offset from the station into operative position above the station, means for driving the shearing element downwardly from its operative position to successively trim the adjacent ends of pieces held by the clamps, means for bringing the trimmed ends together, a welding device in line with the path of the movable carriage on the carriage spaced from the shearing element and arranged to be in operative position at the station when the shearing element is removed therefrom, separate means movable independently of the carriage movement for reciprocating the welding device across the joint between the ends of the pieces to create an attaching weld thereon, and fluid powered elements for actuating the clamps, aligning mechanism, the movable carriage and the means for driving the shearing element downwardly.

6. Apparatus according to claim 5 in which there are electrical and fluid devices designed and arranged for causing the downward driving of the shearing element to automatically follow the actuation of one of the clamps.

7. Apparatus according to claim 5 in which there are means for automatically retracting from the station one of the clamps after the piece of stock held thereby is trimmed by the shearing element.

8. Apparatus for trimming and welding together the ends of successive pieces of metal stock in which there is a common trimming and welding station with associated trimming and welding devices, said apparatus characterized by having a pair of opposed horizontally aligned clamps for holding the ends of two successive pieces of metal stock while they are trimmed and welded together at said station, each of said clamps having a vertically movable upper jaw and a vertically stationary base plate, means for moving the upper jaw of each clamp downwardly to close the clamp, the base plates of said clamps being held in the same horizontal plane, power-driven means associated with each clamp for aligning a piece of metal stock upon the vertically stationary base plate of the clamp prior to the closing of the clamp one of said clamps having a first position in which it holds the end of a piece of metal stock while it is trimmed and having a second position while the end of the piece of metal stock held by the other clamp is trimmed, said second position being horizontally spaced from said first position and farther away than said first position from the other clamp, said clamps being constantly maintained in opposed and horizontally aligned relation, and fluid powered means for moving said one clamp from the first position to the second position.

9. Apparatus according to claim 8 in which there is a third position for said one clamp, while the ends of two pieces of metal stock are being welded together, said third position being closer to the other clamp than said first position, and an adjustable stop against which said one clamp abuts in the third position.

References Cited in the file of this patent

UNITED STATES PATENTS

| | | |
|---|---|---|
| 2,078,365 | Biggert | Apr. 27, 1937 |
| 2,143,969 | Biggert | Jan. 17, 1939 |
| 2,874,266 | Klempay | Feb. 17, 1959 |
| 2,911,515 | Cooper | Nov. 3, 1959 |
| 2,970,206 | Vhrain | Jan. 31, 1961 |